United States Patent [19]

Noda

[11] Patent Number: 4,535,344
[45] Date of Patent: Aug. 13, 1985

[54] RECORDING APPARATUS
[75] Inventor: Atsushi Noda, Yokohama, Japan
[73] Assignee: Canon Kabushiki Kaisha, Tokyo, Japan
[21] Appl. No.: 487,087
[22] Filed: Apr. 21, 1983
[30] Foreign Application Priority Data Apr. 28, 1982 [JP] Japan ................................. 57-70495

[51] Int. Cl.³ .......................... G01D 15/24; B41J 19/50
[52] U.S. Cl. .................................. 346/139 D; 400/328
[58] Field of Search ............................ 400/314–314.6, 400/328; 346/111–113, 136, 139 D, 139 R

[56] References Cited

U.S. PATENT DOCUMENTS 2,622,001 12/1952 Cooley ........................... 346/139 X
3,764,741 10/1973 Long ................................ 178/7.6 X
4,050,568 9/1977 Davies et al. ......................... 197/90
4,123,182 10/1978 Kondur, Jr. ........................ 400/328
4,327,366 4/1982 Schafter et al. ............ 346/76 PH X
4,404,598 9/1983 Scuilli ............................ 358/296 X Primary Examiner—E. A. Goldberg
Assistant Examiner—Gerald E. Preston
Attorney, Agent, or Firm—Fitzpatrick, Cella, Harper & Scinto

[57] ABSTRACT

A recording apparatus comprises a recording head for effecting recording on recording paper, a unit for generating a rotational force, a feed unit for shifting the relative position of the recording head and the recording paper by the rotational force from the rotational force generating unit so that the recording head can record a series of records on the recording paper, a first holding unit for holding the feed unit for rotation and sliding movement in the direction of the axis thereof, and a second holding unit for holding the rotational force generating unit, the second holding unit being fixed to the first holding unit to control the movement of the feed unit in the axial direction.

4 Claims, 7 Drawing Figures

RECORDING APPARATUS

BACKGROUND OF THE INVENTION

1. Field of the Invention

This invention relates to a recording apparatus, and more particularly to a recording apparatus in which the number of parts is reduced and which is compact.

2. Description of the Prior Art

Heretofore, recording apparatuses such as printing apparatuses have been made compact and adopted in electronic desk top type calculators and widely utilized as recording type desk top calculators.

In the conventional printing apparatuses, however, movement of the printing head and paper transfer have been accomplished by discrete drive sources and this has prevented the apparatuses from being made as compact as is desirable.

Therefore, printing apparatuses have been proposed which utilize a single drive motor to effect the head feeding and paper transfer, and this has led to further compactness.

However, use must be made of discrete anti-slippage members to accomplish anti-slippage of the rotary shaft of the pinch roller urged against the paper transfer roller and the resilient member such as a plate spring for obtaining the printing pressure and the pinch roller pressure. This has led to an increased number of parts which in turn has led to difficulties in assembly of as well as higher cost and bulkiness of the apparatus.

SUMMARY OF THE INVENTION

It is an object of the present invention to simplify the structure of the recording apparatus.

It is another object of the present invention to make the recording apparatus easier to assemble and to reduce the number of parts used therein, thereby making the apparatus compact.

Other objects of the present invention, will become apparent from the following detailed description taken in conjunction with the accompanying drawings.

BRIEF DESCRIPTION OF THE DRAWINGS

An embodiment of the present invention is illustrated in the drawings, wherein.

DESCRIPTION OF THE PREFERRED EMBODIMENT

Figure 1:
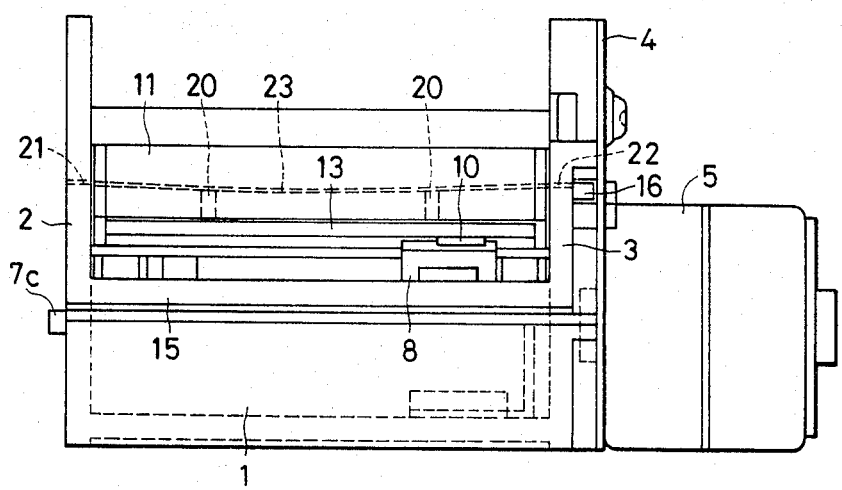
FIG. 1 is a plan view.

Throughout the drawings which illustrate an embodiment of the present invention, identical parts are designated by identical reference numerals.

In the drawings, reference numeral 1 designates a frame which is a first holding member of the apparatus. The frame 1 has a pair of side plates 2 and 3. A motor 5 is fixed to the outer side of the side plate 3 through a mounting plate 4 which is a second holding member.

Figure 6:
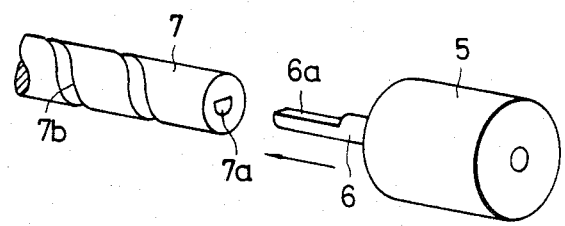
FIG. 6 is a perspective view showing the structure of the connection between a drive motor and a lead screw.

The output shaft 6 of the motor 5 is formed with a D-shape as shown in FIG. 6, and a lead screw 7 is mounted coupled to the shaft at its D-shaped portion 6a. In the end portion of the lead screw 7, which is adjacent to the motor 5, there is formed a bore 7a of D-shaped cross-section with which the D-shaped portion 6a of the output shaft 6 mates, and a spiral guide groove 7b is formed on the peripheral surface of the lead screw 7. The pin of a carriage which will be described later is fitted in the guide groove 7b.

Figure 2:
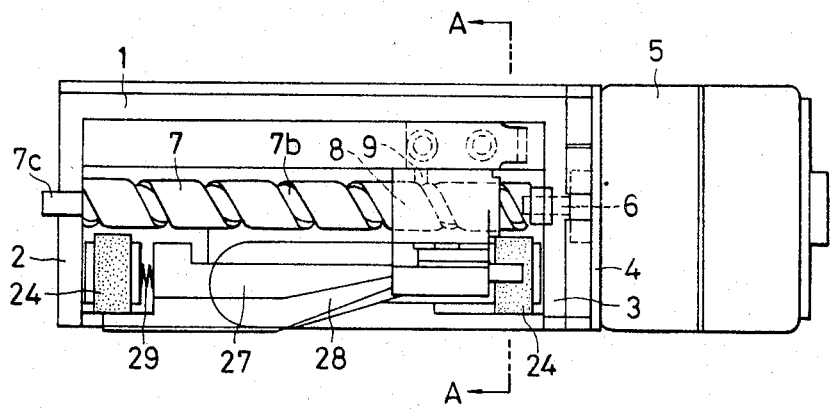
FIG. 2 is a front view.

The lead screw 7, as shown in FIG. 2, has its other end rotatably journalled in the side plate 2 through a small-diameter shaft 7C.

Figure 4:
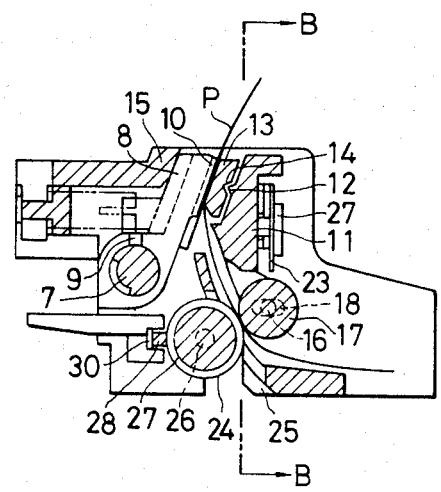
FIG. 4 is a cross-sectional view along line A—A of FIG. 2.

A carriage 8 is fitted to the lead screw 7, and a pin 9 provided on the carriage 8 is fitted in the guide groove 7b as shown in FIGS. 2 and 4. Accordingly, when the motor 5 is rotated in a forward direction and a reverse direction, the lead screw 7 follows the rotation of the motor and the carriage 8 is freely moved forwardly and backwardly. A printing head 10 is attached to the carriage 8.

Figure 2A:
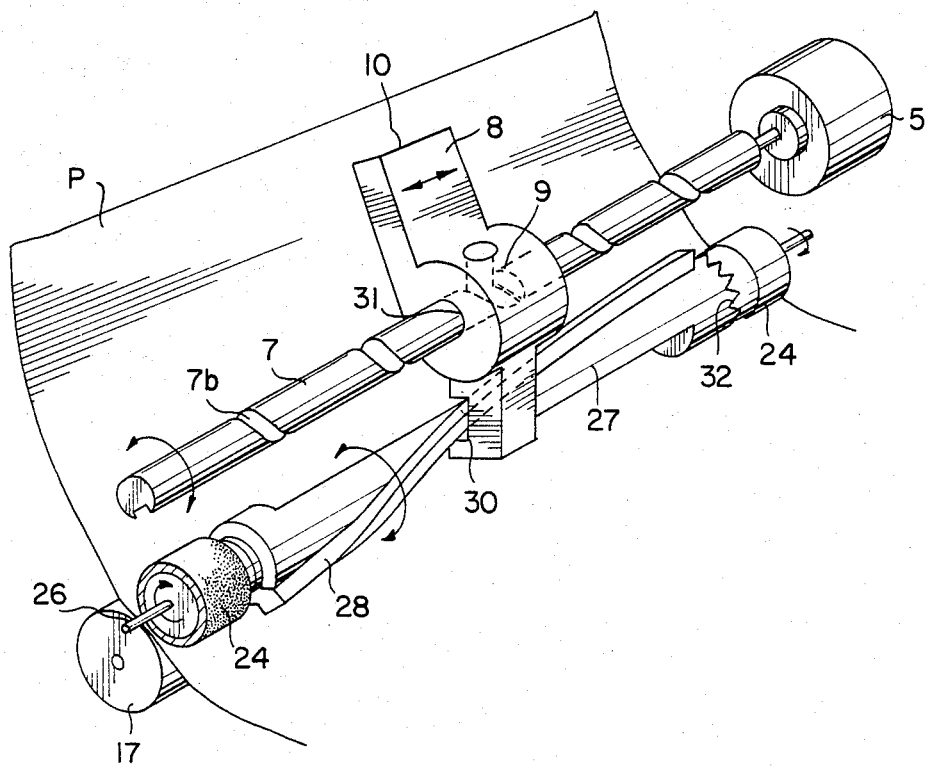
FIG. 2a is a perspective view showing an embodiment of the present invention, useful in describing operation of the invention.

As shown in greater detail in FIG. 2a, the lead screw 7 having the spiral guide groove formed on the peripheral surface thereof is fitted to a through-hole portion 31 of a carriage 8 having the printing head 10 attached thereto. When the lead screw 7 is rotated by the motor 5, the pin 9 projecting inwardly in the through-hole portion 31 of the carriage 8 is received in the guide groove 7b. Accordingly, the carriage may be moved forwardly and backwardly as described above.

A holder 11 extends horizontally in opposed relationship with the carriage 8. A ridge 12 is formed on that side of the holder 11 which is adjacent to the carriage 8, over the full length thereof. This ridge 12 is fitted in an elongated groove 14 formed in the back side of a platen 13. Since the amount of projection of the ridge 12 is greater than the depth of the groove 14, the platen 13 can pivot with the ridge 12 as the fulcrum. On the opposite side to the platen 13 with respect to the carriage 8, a horizontally extending guide 15 is provided integrally within the side plates 2 and 3, and the carriage 8 is guided between the guide 15 and the platen 13.

Figure 3:
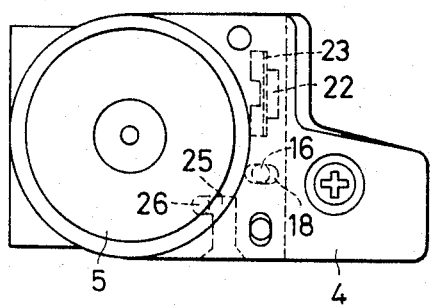
FIG. 3 is a right side view.
Figure 5:
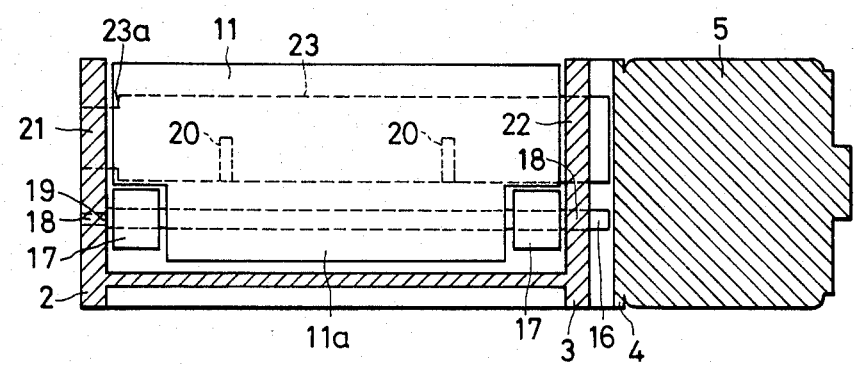
FIG. 5 is a cross-sectional view along line B—B of FIG. 4.

The holder 11, as shown in FIG. 5, has a protrusion 11a in the lower portion thereof. The protrusion 11a is rotatably journalled to a shaft 16 extending horizontally between the side plates 2 and 3. Pinch rollers 17 and 17 are rotatably supported on the shaft 16 at the opposite sides of the protrusion 11a. The shaft 16, as shown in FIGS. 3 and 4, is fitted in slots 18 formed horizontally in the side plates 2 and 3 so that it is movable in the slots 18. An anti-slippage stepped portion 19 is provided on that end portion of the shaft 16 which is adjacent to the side plate 2, and anti-slippage of the other end of the shaft is accomplished by knocking it against the mounting plate 4 of the motor 5.

On the other hand, projections 20 are provided on the back side of the holder 11 at a predetermined interval in the direction of the length thereof. A plate spring 23 which is a resilient member having its opposite ends fitted in holes 21 and 22 formed in the inner sides of the projections 20 and 20.

As shown in FIG. 5, an anti-slippage stepped portion 23a is formed on one end of the plate spring 23, and anti-slippage of the other end is accomplished by bringing it into contact with the mounting plate 4 of the motor. By the pressure force of the plate spring 23, the holder 11 is pushed toward the carriage 8. The shaft 16 is urged against the ends of the slots 18 and 18 which are adjacent to the carriage, through the protrusion 11a in the lower portion of the holder 11, and toward the pinch rollers 24 and 24.

The rubber pinch rollers 24 and 24 are fixed to a shaft 26 having its opposite ends rotatably fitted in substantially L-shaped guide holes 25 and 25 formed in the side plates 2 and 3.

A cam 27 is mounted between the rubber rollers 24 and 24 for rotation and sliding movement relative to the shaft 26. A spiral ridge 28 is provided on the outer peripheral surface of the cam 27. The cam 27 is biased toward the rubber roller 24 adjacent to the motor 5 by a coil spring 29 loosely fitted on the shaft 26.

As shown in FIG. 2a, tooth profiles in mesh engagement with each other are formed on the surfaces of contact between the cam 27 and the rubber roller 24 adjacent to the motor 5 to constitute a one-way clutch or ratchet mechanism 32 which is capable of transmitting only one-way rotation of the cam 27 to the rubber roller 24 adjacent to the motor 5.

On the other hand, the lower portion of the carriage 8 is formed with a guide groove 30 in which is fitted the ridge 28 of the cam 27. Accordingly, as the carriage 8 is moved along the lead screw 7, the cam 27 rotates about the rubber roller shaft 26 through the ridge 28. As a result, the rubber roller 24 adjacent the motor effects rotation for paper feeding due to one-way sliding movement of the carriage 8, or more specifically, the sliding movement of the carriage during its return. That is, the ratchet mechanism 32 provided between the rubber roller 24 adjacent the motor 5 and the cam 27 transmits rotation of the cam 27, developed during sliding movement of the carriage, to the rubber rollers 24 and 24 only during return of the carriage 8. Recording paper P nipped between the rubber rollers 24, 24 and pinch rollers 17, 17 is then fed during the rotation of rollers 24.

On the other hand, the pressure force of the plate spring 23 imparts to the holder 11 a counterclockwise rotational force about the pinch roller shaft 16 as viewed in FIG. 4 and therefore, the platen 13 is urged against the carriage 8 on which the printing head 10, with the guide 15, is mounted, with a predetermined pressure. Thus, the pressure force of the printing head, namely, the printing pressure, against recording paper P is obtained. The platen 13, as previously described, is designed to be pivotable about the ridge 12 relative to the holder 11 and thus follows the movement of the surface of the printing head 10 to thereby ensure that a proper surface of contact is obtained. Also, the holder 11 is urged against the plate spring 23 at two locations through horizontally spaced apart projections 20 and 20 and receives the pressure force of the plate spring, so that any horizontal back-lash of the holder 11 is prevented and the surface of the platen 13 and the surface of the guide 15 are kept in a good degree of parallelism.

Description will hereinafter be made of the operation of the printing apparatus according to the present invention constructed as described above.

During printing operation, the lead screw 7 is rotated in a clockwise direction as viewed in FIG. 2a with rotation of the motor 5 and therefore, the carriage 8 is moved along the lead screw 7 in the leftward direction as viewed in FIGS. 1 and 2a, namely, in the printing direction.

Since the pressure force of the platen 13 is always exerted on the printing head 10 by the plate spring 23, the printing head 10 effects its printing operation while being in contact with the recording paper P. The cam 27 is rotated in the counter-clockwise direction as viewed in FIG. 2a with the movement of the carriage 8 during the printing operation, but the rotation of the cam 27 is not transmitted to the rubber roller 24 adjacent to the motor 5 by the one-way clutch or ratchet mechanism 32, in the portion of contact between the cam 27 and the rubber roller 24 and thus, paper feeding is not effected.

On the other hand, in the case of carriage return, the carriage 8 is moved to the right as viewed in FIGS. 1 and 2a, but in this case the cam 27 is rotated in the clockwise direction as viewed in FIG. 2a and therefore, the one-way clutch or ratchet mechanism 32 between the cam 27 and the rubber roller 24 adjacent to the motor 5 mesh-engage each other and the rubber roller 24 is rotated, so that the recording paper P nipped between the rubber rollers 24, 24 and the pinch rollers 17, 17 by the plate spring 23 is fed.

In this manner, printing operation and paper feeding operation are effected.

As is apparent from the foregoing description, according to the present embodiment, there can be provided an inexpensive, super-compact printing apparatus in which the mounting plate of the driving motor is utilized to provide anti-slippage of one end of the lead screw, pinch roller shaft and plate spring, whereby special anti-slippage structure need not be provided and simple assemblage is possible with the number of parts reduced.

The present invention is not limited to the above-described embodiment, but is also applicable to apparatuses for recording figures and any other recording apparatus.

I claim:

1. A recording apparatus operable in cooperation with recording paper, said apparatus comprising:
    a recording head for recording a series of records on a recording paper;
    means for generating a rotational force;
    feed means having an axis and being coupled to said recording head and to said rotational force generating means, said feed means being driven by said rotational force generating means for pivoted movement about the axis to shift the relative position of said recording head and said recording paper, said recording head being operable to record a series of records on the recording paper during shifting of the relative position of said recording head and paper;
    first holding means for holding said feed means respectively at a first bearing portion and a second bearing portion for said pivoted movement about the axis and for sliding movement in the direction of the axis; and
    second holding means for holding said rotational force generating means, said second holding means being fixed to said first holding means and limiting the sliding movement of said feed means in one direction of the axis thereof.

2. A recording apparatus according to claim 1, wherein said rotational force generating means comprises a motor having an output shaft substantially parallel to the direction of the axis of said feed means.

3. A recording apparatus according to claim 1, wherein said feed means includes a transfer member for effecting relative movement of said recording head and the recording paper, and a roller for feeding the recording paper.

4. A recording apparatus according to claim 3, further comprising a resilient member for generating a force for urging said recording head and the recording paper into engagement throughout the range of relative movement between said recording head and the recording paper, said resilient member being held by said first holding means for movement in the direction of the axis of said feed means and cooperating with said second holding means so that the movement thereof in the one direction of the axis of said feed means is limited.

* * * * *